(12) United States Patent
Tetrick

(10) Patent No.: US 10,746,202 B2
(45) Date of Patent: Aug. 18, 2020

(54) PISTON ASSEMBLY FOR REPHASING A FLUID-DRIVEN ACTUATOR

(71) Applicant: CNH Industrial America, LLC, New Holland, PA (US)

(72) Inventor: James L. Tetrick, Morton, IL (US)

(73) Assignee: CNH Industrial America, LLC, New Holland, PA (US)

( * ) Notice: Subject to any disclaimer, the term of this patent is extended or adjusted under 35 U.S.C. 154(b) by 0 days.

(21) Appl. No.: 16/038,399

(22) Filed: Jul. 18, 2018

(65) Prior Publication Data

US 2020/0025223 A1   Jan. 23, 2020

(51) Int. Cl.
| | |
|---|---|
| *F15B 15/22* | (2006.01) |
| *F15B 15/14* | (2006.01) |
| *F15B 20/00* | (2006.01) |
| *A01B 63/32* | (2006.01) |
| *A01B 63/22* | (2006.01) |
| *F15B 13/02* | (2006.01) |
| *F15B 11/20* | (2006.01) |
| *A01B 73/02* | (2006.01) |

(Continued)

(52) U.S. Cl.
CPC .......... *F15B 15/1447* (2013.01); *A01B 63/22* (2013.01); *A01B 63/32* (2013.01); *F15B 11/20* (2013.01); *F15B 13/024* (2013.01); *F15B 20/007* (2013.01); *A01B 49/027* (2013.01); *A01B 73/02* (2013.01); *F15B 11/048* (2013.01); *F15B 15/225* (2013.01); *F15B 2211/55* (2013.01); *F15B 2211/7053* (2013.01); *F15B 2211/7121* (2013.01)

(58) Field of Classification Search
CPC ...... F15B 15/225; F15B 11/046; F15B 11/048
See application file for complete search history.

(56) References Cited

U.S. PATENT DOCUMENTS

| 3,182,563 A | 5/1965 | Neilan |
| 4,326,449 A | 4/1982 | Perraud |
| 4,729,283 A | 3/1988 | Hillier |

(Continued)

FOREIGN PATENT DOCUMENTS

JP    S5962704 A    4/1984

OTHER PUBLICATIONS

Rosenbecker, Getting your system in Sync Part 2, Energy Mfg Co:, Hydraulics & Pneumatics, Jul. 13, 2006, 4 pages.

*Primary Examiner* — F Daniel Lopez
(74) *Attorney, Agent, or Firm* — Rebecca L. Henkel; Rickard K. DeMille

(57) ABSTRACT

In one aspect, a piston assembly for a fluid-driven actuator may include a piston defining a passage extending between first and second chambers of the actuator. The piston assembly may further include a valve having a valve head and a valve stem. The valve may be positioned within the passage and slidable between an open position and a closed position. The valve stem may extend outward from the passage into the second chamber when the valve is positioned in the closed position. Additionally, the piston assembly may include a spring compressed between the valve head and the piston. The spring may be configured to bias the valve to the closed position. The valve may be configured to move to the open position when a pressure in the second chamber exceeds a pressure threshold or when the valve stem contacts a cylinder of the fluid-driven actuator.

19 Claims, 6 Drawing Sheets

(51) Int. Cl.
  *A01B 49/02* (2006.01)
  *F15B 11/048* (2006.01)

(56) References Cited

U.S. PATENT DOCUMENTS

| | | | |
|---|---|---|---|
| 5,425,305 | A | 6/1995 | Mauritz |
| 5,802,953 | A * | 9/1998 | Nakamura .......... F15B 15/1409 91/422 |
| 6,176,170 | B1 * | 1/2001 | Uppgard ............. F15B 15/1476 440/61 G |
| 7,537,079 | B2 | 5/2009 | Krieger et al. |
| 8,444,400 | B2 | 5/2013 | Khalil |
| 8,555,635 | B2 | 10/2013 | Webster et al. |
| 8,850,952 | B2 | 10/2014 | Albrecht et al. |
| 9,010,234 | B1 | 4/2015 | Foster |
| 2014/0260956 | A1 | 9/2014 | Williams |

* cited by examiner

PISTON ASSEMBLY FOR REPHASING A FLUID-DRIVEN ACTUATOR

FIELD

The present disclosure generally relates to fluid-driven actuators and, more specifically, to piston assemblies with valves for use in rephasing fluid-driven actuators.

BACKGROUND

Agricultural implements generally include various fluid-driven actuators, such as hydraulic cylinders, for adjusting the relative positioning between certain components of the implement. For example, actuators may be used to adjust the positions of ground-engaging tools, such as a gang of discs, relative to a frame of the implement. Specifically, the actuators may move the ground-engaging tools between an operating position, where the ground-engaging tools are positioned to engage the soil, and a non-operating position, where the ground-engaging tools are lifted up to permit storage and/or transportation on a road.

Several of the actuators on the implement may be fluidly coupled together in series so as to be operated by a single fluid power source and control valve. In such circuit configuration, each actuator, when properly designed, extends and retracts in a generally synchronized manner. However, the synchronization of the actuators is not exact due to the presence of air in the circuit and/or leakage of fluid past pistons of the actuators.

Rephasing ports may be used to correct the synchronization of the actuators in series when leakage occurs. Specifically, rephasing ports are formed in a cylinder of each actuator to permit the actuators to fully extend and/or fully retract. During operation of each actuator in the series, the corresponding piston must slide past the rephasing port twice per stroke cycle. Contact with the edges of the rephasing port often results in excessive wear occurring to the seals coupled to the corresponding piston. Reducing the size of the rephasing ports reduces the wear on the seals, but also increases the time necessary to rephase the circuit. Furthermore, using a harder seal may reduce wear caused by contact with the rephasing ports, but harder seals do not seal as well as softer seals, thereby resulting in increased leakage past the piston.

Accordingly, an improved piston assembly with a valve for use in rephasing a fluid-driven actuator would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a piston assembly for a fluid-driven actuator. The piston assembly may include a piston separating first and second chambers of the fluid-driven actuator. The piston may define a passage extending between the first and second chambers. The piston assembly may further include a valve having a valve head and a valve stem. The valve may be positioned within the passage and slidable between an open position in which the valve head permits fluid flow through the passage and a closed position in which the valve head occludes fluid flow through the passage. The valve stem may extend outward from the passage into the second chamber when the valve is positioned in the closed position. Additionally, the piston assembly may include a spring compressed between the valve head and the piston. The spring may be configured to bias the valve to the closed position. The valve may be configured to move to the open position when a pressure in the second chamber exceeds a pressure threshold or when the valve stem contacts a cylinder of the fluid-driven actuator.

In another aspect, the present subject matter is directed to an agricultural implement. The agricultural implement may include a plurality of agricultural implement components and first and second fluid-driven actuators. Each fluid-driven actuator may be coupled between two of the plurality of agricultural implement components. Each fluid-driven actuator may include a cylinder defining first and second chambers. Each fluid-driven actuator may further include a piston positioned within the associated cylinder. Each piston may separate the associated first and second chambers. Each piston may define a passage extending between the associated first and second chambers. Each fluid-driven actuator may include a valve having a valve head and a valve stem. Each valve may be positioned within the associated passage and slidable between an open position in which the associated valve head permits fluid flow through the associated passage and a closed position in which the associated valve head occludes fluid flow through the associated passage. Each valve stem may extend outward from the associated passage into the associated second chamber when the associated valve is positioned in the closed position. Additionally, each fluid-driven actuator may include a spring compressed between the associated valve head and the associated piston. Each spring may be configured to bias the associated valve to the closed position. Each valve may be configured to move to the open position when a pressure in the associated second chamber exceeds a pressure threshold or when the associated valve stem contacts the associated cylinder.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
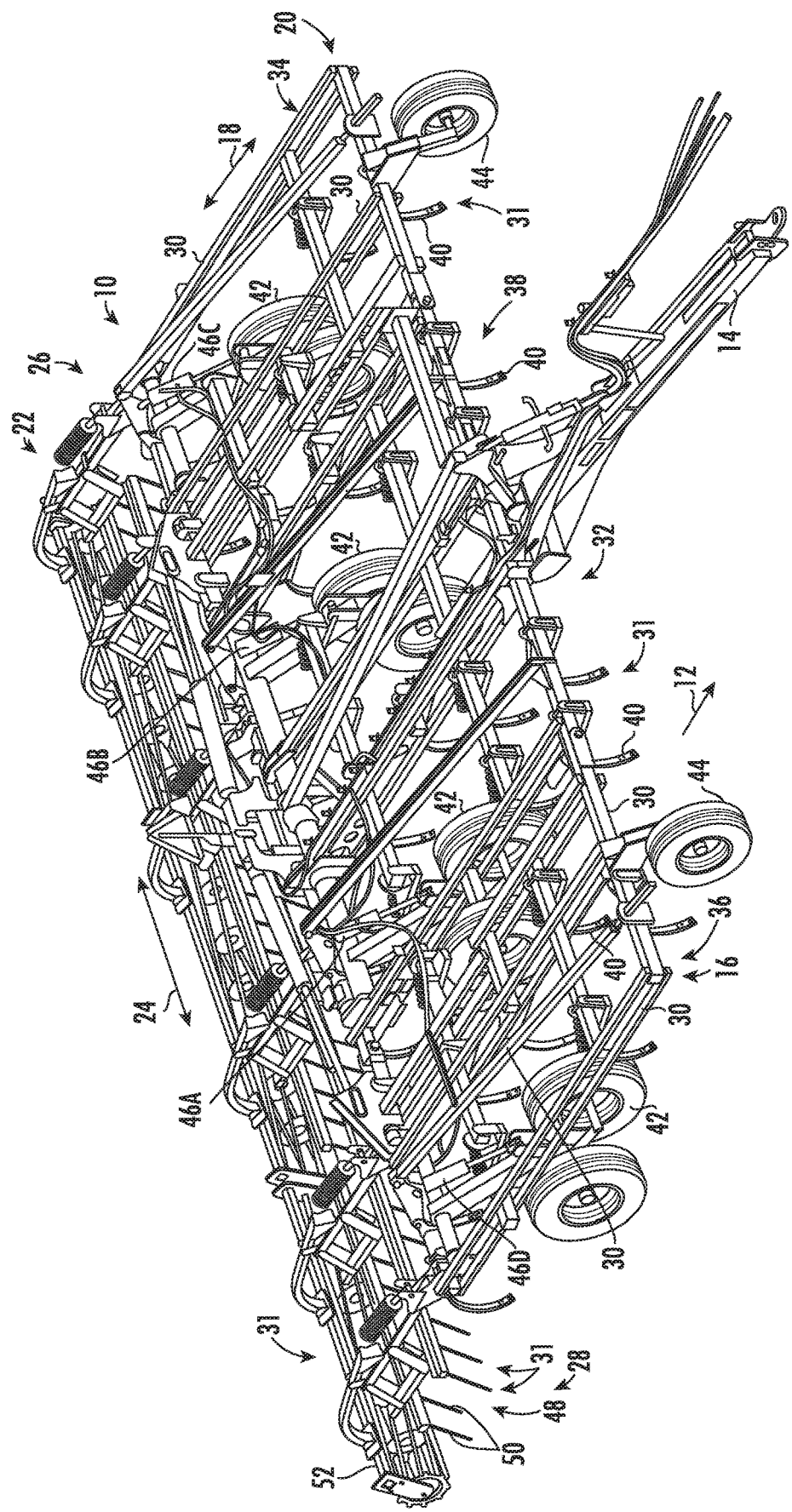
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a piston assembly for use in a fluid-driven actuator. Specifically, the disclosed piston assembly may permit rephasing of the actuator so as to maintain uniform, synchronized movement between a plurality of actuators arranged in series. For example, in several embodiments, the piston assembly may include a piston separating rod-side and cap-side chambers of the actuator. A passage may be defined through the piston that provides a flow channel extending between the rod-side and cap-side chambers. The piston assembly may also include a valve positioned within the passage so as to be slidable or movable between a closed position and an open position. When in the closed position, the valve may occlude fluid flow through the passage and between the rod-side and cap-side chambers, thereby allowing a pressure differential in the fluid of the rod-side and cap-side chambers to act on the piston. Conversely, when in the open position, the valve may permit fluid flow through the passage and between the rod-side and cap-side chambers. Allowing fluid to bypass the piston in certain instances, such as when the actuator is fully extended or retracted, may rephase or otherwise synchronize the movement of the actuators fluidly coupled in series. Additionally, the piston assembly may further include a spring compressed between the valve and the piston so as to bias the valve to the closed position. In such an embodiment, when the pressure in one of the rod-side and cap-side chambers exceeds a threshold, the biasing force applied by the spring may be overcome, thereby allowing the valve to move from the closed position to the open position. In addition, the valve may also move from the closed position to the open position when a valve stem of the valve of contacts a cylinder of the actuator, such as when the actuator is fully extended or retracted. The piston assembly may permit the use of soft elastomeric seals on the piston, thereby providing improved sealing.

Referring now to FIG. 1, a perspective view of one embodiment of an agricultural implement 10 is illustrated in accordance with aspects of the present subject matter. In general, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components, such as ground-engaging elements 31.

In several embodiments, the frame 16 may include one or more frame sections. As illustrated in FIG. 1, for example, the frame 16 may include a main frame section 32 positioned centrally between the first and second sides 26, 28 of the frame 16. In addition, the frame 16 may include a first wing section 34 positioned proximate to the first side 26 of the frame 16. Similarly, the frame 16 may include a second wing section 36 positioned proximate to the second side 28 of the frame 16. In several embodiments, the first and second wing sections 34, 36 may be pivotably coupled to the main frame section 32 so as to be moveable relative to the main frame section 32. For example, the first and second wing sections 34, 36 may be configured to fold up relative to the main frame section 32 to reduce the lateral width of the implement 10 to permit, for example, storage or transportation of the implement 10 on a road. In should be appreciated, however, that the frame 16 may include any other suitable number of frame sections, such as by including two additional wing sections disposed along each side 26, 28 of the frame 16.

In one embodiment, the frame 16 may be configured to support a cultivator 38, which may be configured to till or otherwise break the soil over which the implement 10 travels to create a seedbed. Specifically, the cultivator 38 may include a plurality of the ground-engaging tools 31, such as shanks 40, which are pulled through the soil as the implement 10 moves across the field in the direction of travel 12. As shown, the shanks 40 may be arranged so as to be spaced apart from one another horizontally across the implement 10. For example, at least some of the shanks 40 may be spaced apart from one another along the longitudinal direction 18 of the implement 10 between the forward and aft ends 22, 24 of the frame 16. Similarly, at least some of the shanks 40 may be spaced apart from one another along the lateral direction 24 of the implement 10 between the first and second sides 26, 28 of the frame 16. In this regard, each frame section 32, 34, 36 of the frame 16 may be configured to support at least one of the shanks 40. For instance, one or more of the shanks 40 may be coupled to or supported by the main frame section 32 and/or while one or more other shanks 40 may be supported by each of the wing sections 34, 36 of the frame 16.

The implement 10 may further include a plurality of center support wheel assemblies 42 coupled to the frame 16 to support the frame 16 relative to the ground and to facilitate towing the implement 10 in the direction of travel 12. As shown, the center support wheel assemblies 42 may be located centrally on the implement's frame 16 between its forward and aft ends 20, 22, with the center support wheel assemblies 42 being spaced apart from one another in the lateral direction 24 of the implement 10 between its first and second sides 26, 28. In such an embodiment, one or more of the center support wheel assemblies 42 may be coupled to each section of the frame 16. For example, as shown in FIG. 1, two center support wheel assembly 42 are coupled to the main frame section 32, while the one center support wheel assembly 42 is coupled to each of the wing sections 34, 36. In addition, the implement 10 may also include a plurality of forward support tire wheels s 44 coupled to the frame 16 proximate to the forward end 20 of the frame 16, such as by including one or more forward support wheels 44 coupled to the first wing section 34 at the forward end 20 of the frame 16 and one or more forward support wheels 44 coupled to the second wing section 36 at the forward end 20 of the frame 16. As shown in FIG. 1, the forward support wheels 44 may be spaced apart from the center support wheels 42 in the longitudinal direction 18 of the implement 10. It should be appreciated that the implement 10 may include additional wheels or fewer wheels in alternate embodiments.

In addition, the implement 10 may also include any number of suitable actuators (e.g., hydraulic cylinders) for adjusting the relative positioning one or more components of the implement 10. In one embodiment, the implement 10 may include actuators 46 coupled to the frame 16 for raising or lowering the frame 16 relative to the ground, thereby allowing the penetration depth and/or the down pressure of the ground engaging tools 31 to be adjusted. For example, as shown in FIG. 1, the implement 10 may include a first actuator 46A coupled between the main frame section 32 and one of the wheel assemblies 42 coupled to the main frame section 32. The implement 10 may include a second actuator 46B coupled between the main frame section 32 and the other wheel assembly 42 coupled to the main frame section 32. Furthermore, the implement 10 may include a third actuator 46C coupled between the first wing section 34 and the wheel assembly 42 coupled to the first wing section 34. Additionally, the implement 10 may include a fourth actuator 46D coupled between the second wing section 36 and the wheel assembly 42 coupled to the second wing section 36. However, it should be appreciated that, in alternative embodiments, the implement 10 may include any other suitable actuators for adjusting the relative positioning between components of the implement 10.

Moreover, as shown in FIG. 1, the implement 10 may also include one or more harrows 48. As is generally understood, the harrows 48 may be configured to be pivotally coupled to the frame 16. The harrows 48 may include a plurality of ground-engaging tools 31, such as tines or spikes 50, which are configured to level or otherwise flatten any windrows or ridges in the soil created by the cultivator 38. Specifically, the tines 50 may be configured to be pulled through the soil as the implement 10 moves across the field in the direction of travel 12. It should be appreciated that the implement 10 may include any suitable number of harrows 48. In fact, some embodiments of the implement 10 may not include any harrows 48.

Moreover, in one embodiment, the implement 10 may optionally include additional ground-engaging tools 31, such as one or more baskets or rotary firming wheels 52. As is generally understood, the baskets 52 may be configured to reduce the number of clods in the soil and/or firm the soil over which the implement 10 travels. As shown, each basket 52 may be configured to be pivotally coupled to one of the harrows 48. Alternately, the baskets 52 may be configured to be pivotally coupled to the frame 16 or any other suitable location of the implement 10. It should be appreciated that the implement 10 may include any suitable number of baskets 52. In fact, some embodiments of the implement 10 may not include any baskets 52.

Figure 2:
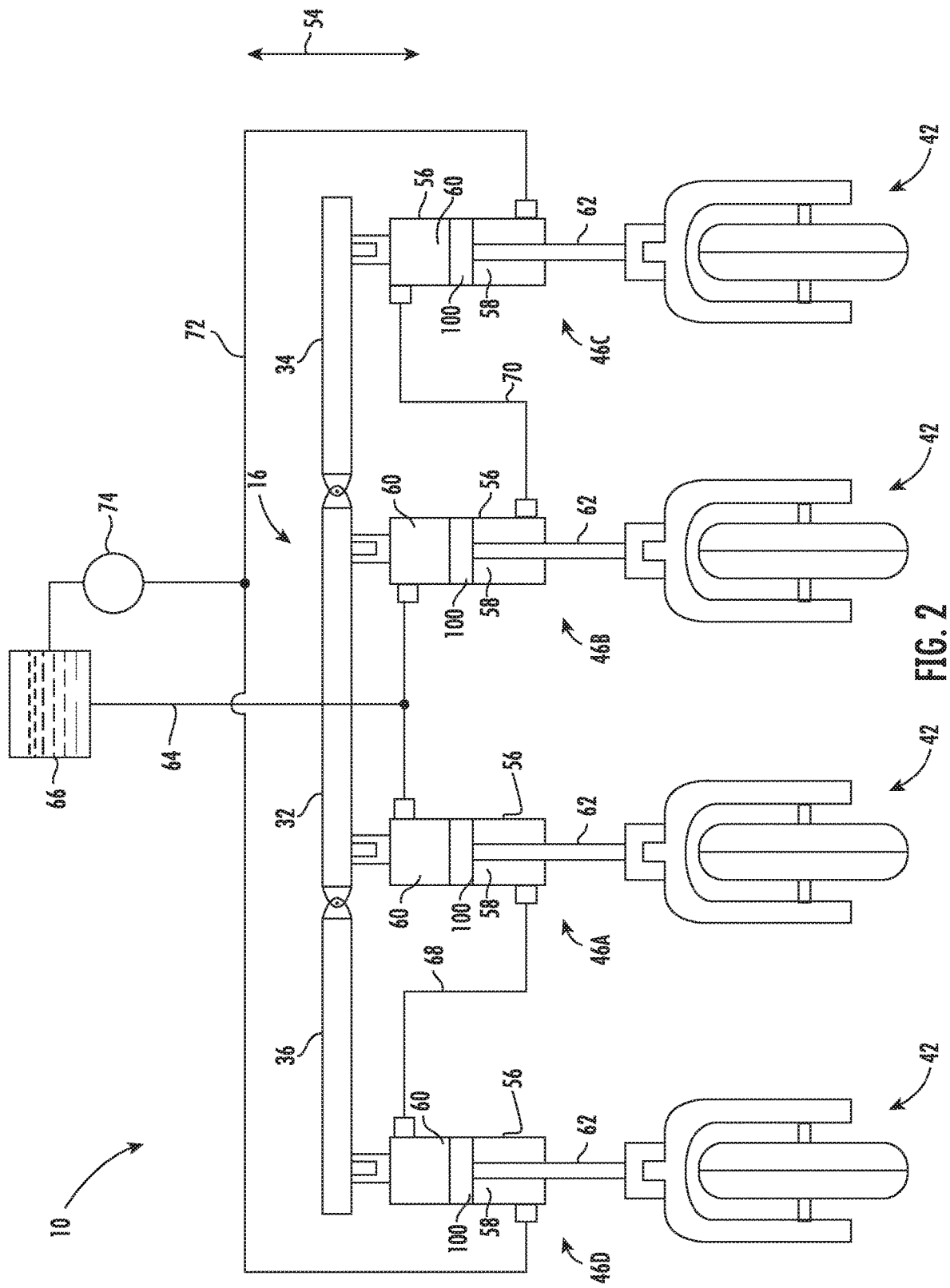
FIG. 2 illustrates a schematic view of one embodiment of three fluid-driven actuators of an agricultural implement in accordance with aspects of the present subject matter, particularly illustrating the fluid-driven actuators being fluidly coupled in series.

Referring now to FIG. 2, a schematic view of the actuators 46A, 46B, 46C, 46D for raising and lowering the frame 16 relative to the ground is illustrated in accordance with aspects of the present subject matter. As indicated above, each of the actuators 46A-D may be coupled between the frame 16 and one of wheel assemblies 42. As such, the actuators 46A-D may be configured to move the corresponding wheel assembly 42 toward and away from the frame 16 (e.g., as indicated by arrow 54 in FIG. 2) when the actuators 46A-D extend and retract. For example, moving the wheel assemblies 42 toward from the frame 16 may increase the penetration depths of and/or down pressure on the ground-engaging tools 31. Conversely, moving the wheel assemblies 42 away from the frame 16 may decrease the penetration depths of and/or down pressure on the ground-engaging tools 31. Although FIG. 2 illustrates four actuators 46A-D, it should be appreciated that any suitable number of actuators 46 may be coupled between the frame 16 and the associated wheel assemblies 42.

As shown in FIG. 2, the actuators 46A-D may be fluidly coupled together. Specifically, in several embodiments, the actuators 46A, 46D may be coupled in series and the actuators 46B, 46C are coupled in series. In this regard, the actuators 46A, 46D may be coupled in parallel with the actuators 46B, 46C. Furthermore, each actuator 46A-D may include a cylinder 56 defining a rod-side chamber 58 and a cap-side chamber 60 therein. In general, the diameter of the cylinder 56 of the actuator 46D may be smaller than the diameter of the cylinder 56 of the actuator 46A. Similarly, the diameter of the cylinder 56 of the actuator 46C may be smaller than the diameter of the cylinder 56 of the actuator 46B. As shown, a piston assembly 100 may be positioned within each cylinder 56 to separate the associated the rod-side and cap-side chambers 58, 60. Each of the actuators 46A-D may further include a rod 62 extending outward from the associated piston assembly 100. Additionally, in the illustrated embodiment, a first fluid conduit 64 may fluidly couple a fluid reservoir 66 to the cap-side chambers 60 of the actuators 46A, 46B. A second fluid conduit 68 may fluidly couple the rod-side chamber 58 of the actuator 46A to the cap-side chamber 60 of the actuator 46D. Moreover, a third fluid conduit 70 may fluidly couple the rod-side chamber 58 of the actuator 46B to the cap-side chamber 60 of the actuator 46C. Furthermore, a fourth fluid conduit 72 may fluidly couple the rod-side chambers 58 of the actuators 46C, 46D to the fluid reservoir 66. It should be appreciated that, in alternative embodiments, the actuators 46A-D may be fluidly coupled together in any other suitable manner.

In general, suitable components, such as a fluid pump 74 and/or a control valve (not shown), may provide a volume of fluid from the reservoir 66 to the actuators 46A, 46B via the first fluid conduit 64 to extend the rods 62 of the actuators 46A-D. Specifically, in one embodiment, the first fluid conduit 64 may supply volumes of fluid to the cap-side chambers 58 of the actuators 46A, 46B, thereby moving the associated piston assemblies 100 and rods 62 away from the frame 16. The movement of the piston assemblies 100 may displaces volumes of fluid from the rod-side chambers 58 of the actuator 46A, 46B. In this regard, the volume of fluid displaced from the rod-side chamber 58 of the actuator 46A may flow through the second conduit 68 to the cap-side chamber 60 of the actuator 46D. Similarly, the volume of fluid displaced from the rod-side chamber 58 of the actuator 46B may flow through the third conduit 70 to the cap-side chamber 60 of the actuator 46C. The volumes of fluid supplied to the actuators 46C, 46D may, in turn, move the associated piston assemblies 100 and rods 62 away from the frame 16, thereby displacing volumes of fluid from the rod-side chambers 58 of the actuators 46C, 46D. This fluid may be returned to the reservoir 66 via the fourth fluid conduit 72 in the embodiment shown in FIG. 2. In operation, the rods 62 of the actuators 46A-D may move simultaneously. A person of ordinary skill in the art would appreciate that the rods 62 of the actuators 46A-D may be retracted in a similar manner by supplying fluid to the rod-side chambers 58 of the actuator 46C, 46D.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
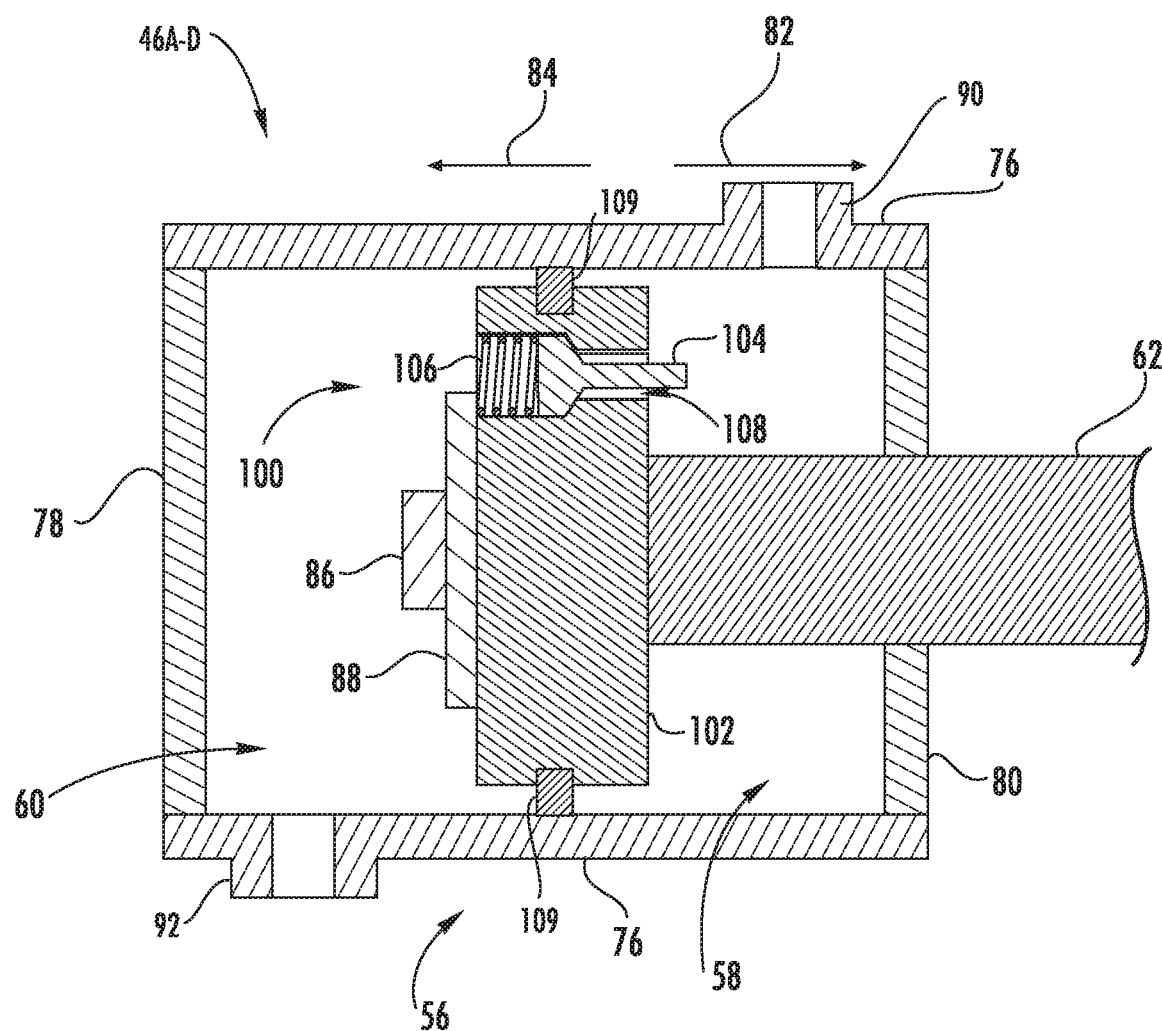
FIG. 3 illustrates a cross-sectional view of one embodiment of a fluid-driven actuator in accordance with aspects of the present subject matter, particularly illustrating a piston assembly having a piston and a valve positioned within a passage defined by the piston.

Referring now to FIG. 3, a cross-sectional view of one embodiment of one of the fluid-driven actuators 46A-D described above is illustrated in accordance with aspects of the present subject matter. As shown and indicated above, the actuator 46A-D may include a cylinder 56, which defines associated rod-side and cap-side chambers 58, 60. Specifically, in one embodiment, the cylinder 56 may include a barrel 76, an end cap 78 coupled to one end of the barrel 76, and a gland 80 coupled to the opposed end of the barrel 76. It should be appreciated that, in alternative embodiments, the cylinder 56 may have any other suitable construction. For example, the barrel 76 and the end cap 78 may be a single, integral component.

The actuator 46A-D may also include a piston assembly 100 positioned within the cylinder 56, with the piston assembly 100 being coupled to an associated rod 62. Specifically, in several embodiments, the piston assembly 100 may be slidable or movable within the cylinder 56. For example, the piston assembly 100 may be moved in a first direction relative to the cylinder 56 (e.g., as indicated by arrow 82 in FIG. 3) such that the rod 62 extends outward from the cylinder 56. The piston assembly 100 may also be moved in a second direction relative to the cylinder 56 (e.g., as indicated by arrow 84) such that the rod 62 retracts into the cylinder 56. As shown, the piston assembly 100 may separate the rod-side and cap-side chambers 58, 60 of the actuator 46A-D. As such, in the illustrated embodiment, the rod-side chamber 58 may be defined by the barrel 76, the gland 80, and the piston assembly 100. Similarly, the cap-side chamber 60 may be defined by the barrel 76, the end cap 78, and the piston assembly 100. The cylinder 56 may also include a rod-side port 90 configured to fluidly couple the rod-side chamber 58 to one of the fluid conduits 64, 68, 70, 72. Moreover, the cylinder 56 may also include a cap-side port 92 configured to fluidly couple the cap-side chamber 60 to another of the fluid conduits 64, 68, 70, 72. A person of ordinary skill in the art would appreciate that the volumes of the rod-side and cap-side chambers 58, 60 may vary based on the position of the piston assembly 100 within the cylinder 56. Additionally, in one embodiment, the piston assembly 100 may be coupled to the rod 62 of the actuator 46A-D via a suitable fastener 86 and a washer 88.

As shown in FIG. 3, the piston assembly 100 generally includes a piston 102, a valve 104, and a spring 106. Specifically, in several embodiments, the piston 102 may define a passage 108 extending between the rod-side and cap-side chambers 58, 60. The valve 104 may be positioned within the passage 108 so as to be slidable or movable between a closed position (FIGS. 3 and 6) and an open position (FIG. 7). When in the closed position, the valve 104 may occlude fluid flow between the rod-side and cap-side chambers 58, 60. Conversely, fluid may flow between the rod-side and cap-side chambers 58, 60 when the valve 104 is in the open position. The spring 106 may bias the valve 104 to the closed position as shown in FIG. 3. As will be described below, the valve 104 may move to the open position in certain instances to permit fluid to flow between the rod-side and cap side chambers 58, 60, thereby allowing the actuator 46A-D to be rephased. Additionally, as shown in FIG. 3, the piston assembly 100 may include a seal 109 coupled to the piston 102 to reduce leakage of fluid between the rod-side and cap-side chambers 58, 60.

Figure 4:
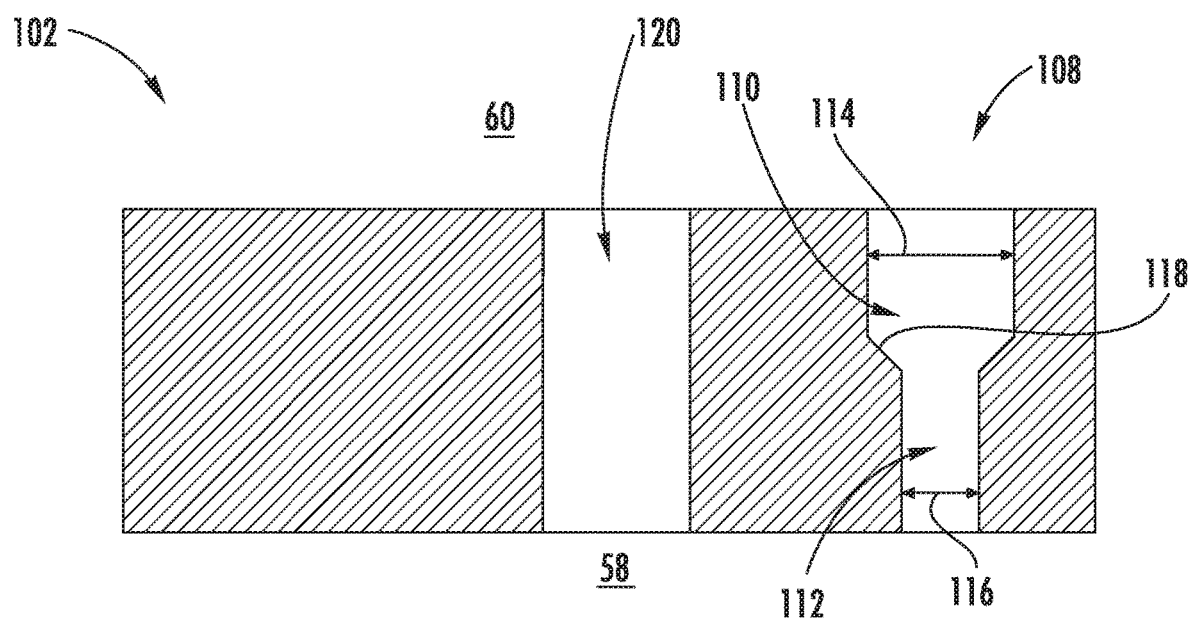
FIG. 4 illustrates a cross-sectional view of the piston of the piston assembly shown in FIG. 3, particularly illustrating a passage defined by the piston for receiving the associated valve.
Figure 5:
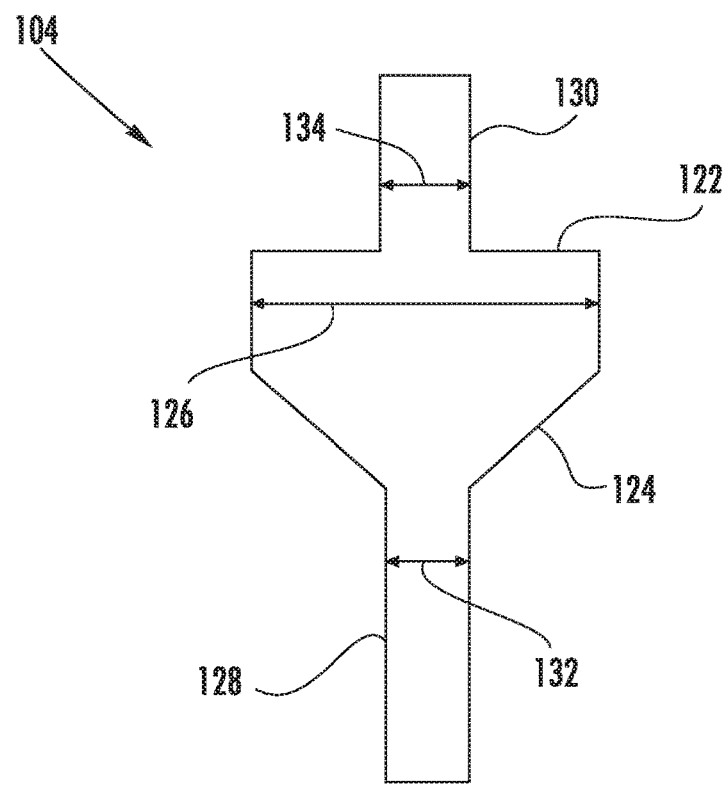
FIG. 5 illustrates a side view of the valve of the piston assembly shown in FIG. 3, particularly illustrating the valve including a valve head and first and second valve stems extending outward from the valve head.

Referring now to FIG. 4, a cross-sectional view of one embodiment of the piston 102 described above with reference to FIG. 3 is illustrated in accordance with aspects of the present subject matter. Specifically, as indicated above, the piston 102 defines a passage 108 extending between the rod-side and cap-side chambers 58, 60. In several embodiments, the passage 108 may include a first passage portion 110 in fluid communication with the cap-side chamber 60 and a second passage portion 112 in fluid communication with the rod-side chamber 58. As shown, the first passage portion 110 may have a first passage portion diameter (e.g., as indicated by arrow 114) and the second passage portion 112 may have a second passage portion diameter (e.g., as indicated by arrow 116). In one embodiment, the first passage portion diameter 114 may be larger than the second passage portion dimeter 116. The piston 102 may further define a valve seat 118. In general, the valve seat 118 may be positioned at or proximate to the intersection of the first and second passage portions 110, 112. As shown in FIG. 5, the valve seat 118 may be oriented at an acute or obtuse angle relative to a centerline of the passage 108 so as to transition between the wider first passage portion 110 and the narrower second passage portion 112. It should be appreciated that, in alternative embodiments, the valve seat 118 may be perpendicular to the centerline of the passage 108. As will be described below, the valve 104 is configured to be in contact with the valve seat 118 when in the closed position so as to occlude fluid flow through the passage 108. Additionally, in one embodiment, the piston 102 may define a mounting aperture 120 configured to receive the fastener 86 (FIG. 3).

Referring now to FIG. 5, a side view of the valve 104 described above with reference to FIG. 3 is illustrated in accordance with aspects of the present subject matter. As shown, in several embodiments, the valve 104 may include a valve head 122 having a mating surface 124 configured to be in contact with the valve seat 118 of the piston 102 when the valve 104 is in the closed position. In the illustrated embodiment, the mating surface 124 may be oriented at an acute or obtuse angle relative to a centerline of the valve 104 so as to mate with the valve seat 118. However, it should be appreciated that the mating surface 124 may have any suitable orientation for mating with the valve seat 118. Furthermore, as shown, the valve head 122 may have a valve head diameter 126. In several embodiments, the valve 104 may also include a first valve stem 128 extending outward from one side of the valve head 122. In one embodiment, the valve 104 may also include a second valve stem 130 extending outwardly from an opposing side of the valve head 122. The first and second valve stems 128, 130 may have a first valve stem diameter 132 and a second valve stem diameter 134, respectively. As shown, the valve head diameter 126 may be larger than the first and second valve stem diameters 132, 134. Additionally, the first and second valve stem diameters 130, 132 may be the same size or different sizes.

Figure 6:
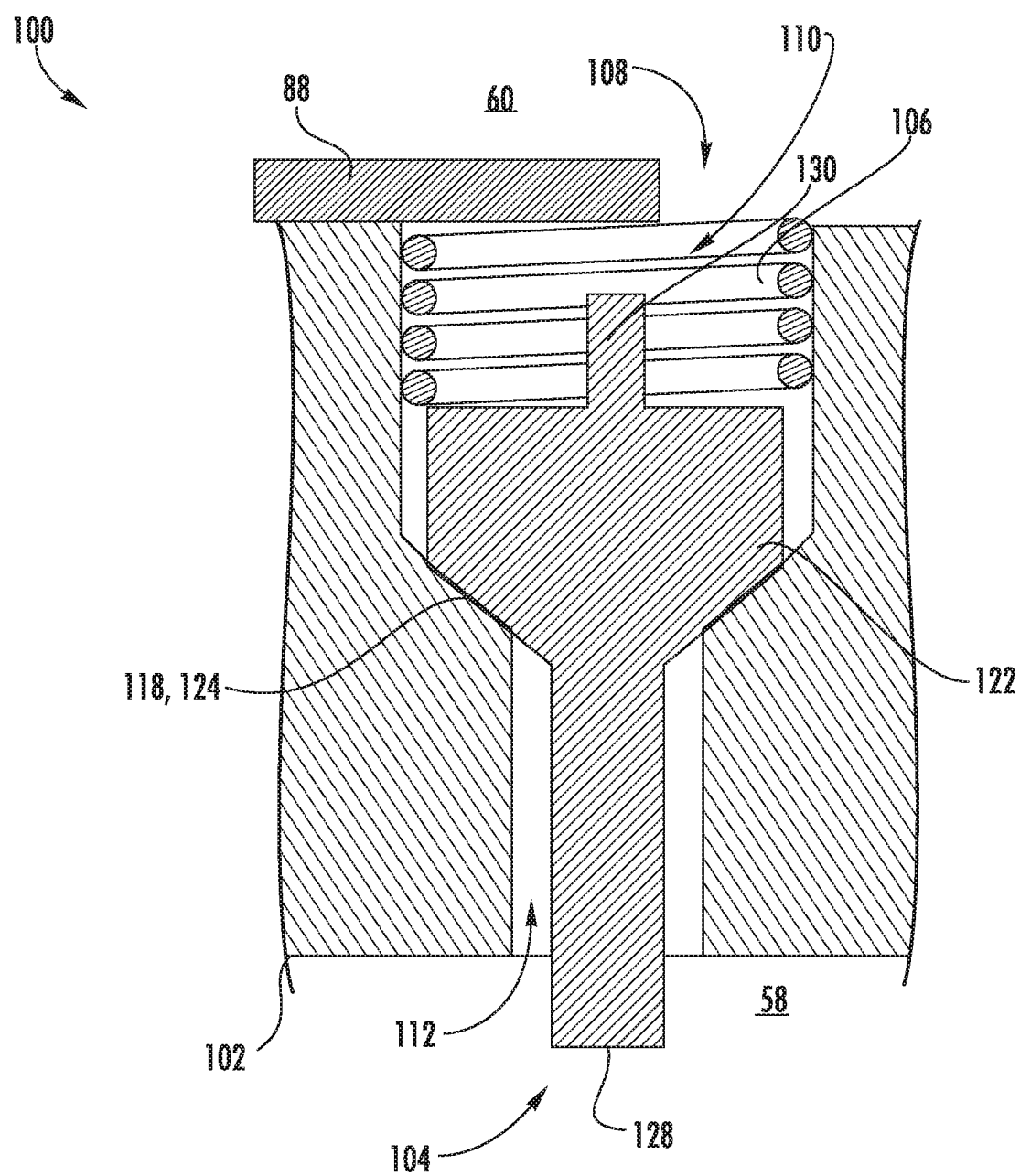
FIG. 6 illustrates an enlarged cross-sectional view of a portion of the piston assembly shown in FIG. 3, particularly illustrating the valve at a closed position relative to the piston.
Figure 7:
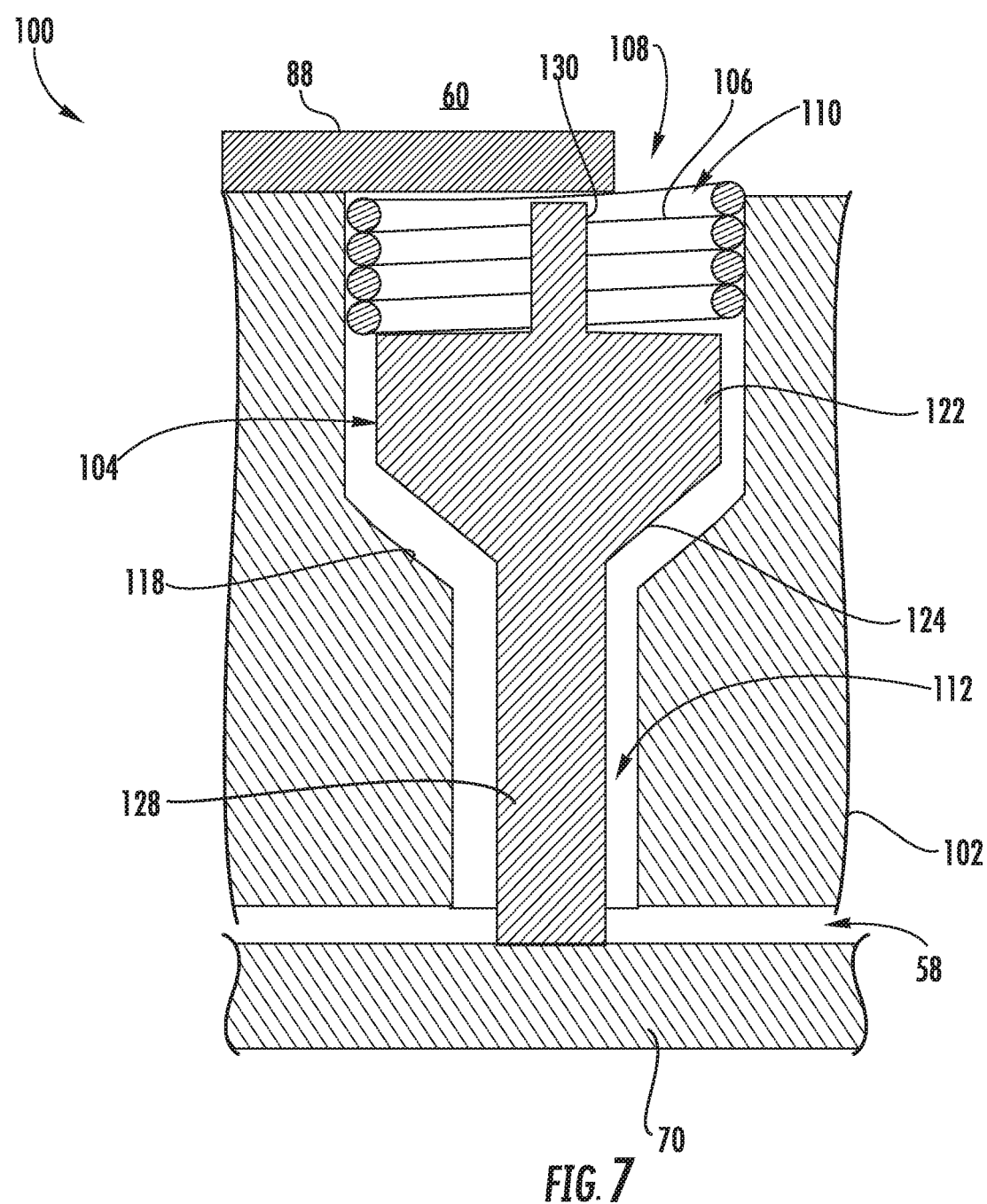
FIG. 7 illustrates another enlarged cross-sectional view of a portion of the piston assembly shown in FIG. 3, particularly illustrating the valve at an open position relative to the piston.

Referring now to FIGS. 6 and 7, partial cross-sectional views of one embodiment of the piston assembly 100 described above with reference to FIG. 3 are illustrated in accordance with aspects of the present subject matter. Specifically, FIG. 6 illustrates a cross-sectional view of the piston assembly 100 when the valve 104 is located in the closed position. Additionally, FIG. 7 illustrates a cross-sectional view of the piston assembly 100 when the valve 104 is located in the open position.

As shown in FIGS. 6 and 7, the valve head 122 and second valve stem 130 may generally be positioned within the first passage portion 110 of the passage 108 defined by the piston 102, while the first valve stem 128 may generally be positioned within the second passage portion 112 of the passage 108. Specifically, in several embodiments, the valve head diameter 126 may be smaller than the first passage portion diameter 114 so as to permit fluid flow through the first passage portion 110. However, the valve head diameter 126 may be larger than the second passage portion diameter 116 so as to occlude fluid flow between the first and second passage portions 110, 112 when the mating surface 124 of the valve head 122 is in contact with the valve seat 118. Furthermore, the first valve stem diameter 132 may be smaller than the second passage portion diameter 116 so as to permit fluid flow through the second passage portion 112.

As indicated above, the spring 106 of the disclosed piston assembly 100 may be configured to bias the valve 104 into the closed position. Specifically, in several embodiments, the spring 106 may be compressed between the valve head 122 and the washer 88 used to couple the rod 62 to the piston 102, thereby biasing the valve 104 to the closed position. However, it should be appreciated that the spring 106 may be compressed between the valve head 122 and any component of the piston assembly 100 that is fixed relative to the piston 102. As will be described below, the valve 104 may move to the open position when the biasing force exerted by the spring 106 is overcome. Additionally, in one embodiment, the second valve stem 130 may be positioned concentrically within the spring 106.

As particularly shown in FIG. 6 and indicated above, the valve 104 may occlude fluid flow through the passage 108 when in the closed position, thereby preventing fluid flow between the rod-side and cap-side chambers 58, 60. Specifically, in several embodiments, the spring 106 forces the mating surface 124 of the valve head 122 into sealing contact with the valve seat 118 to prevent fluid from flowing between the first and second passage portions 110, 112. As such, a pressure differential between the rod-side and cap-side chambers 58, 60 may act on the piston assembly to extend or retract the rod 62 relative to the cylinder 56. Additionally, as shown in FIG. 6, a portion of the first valve stem 128 may extend outward from second passage portion 112 and into the rod-side chamber 58 when the valve 104 is in the closed position.

As mentioned above, in certain instances, the biasing force exerted by the spring 106 on the valve 104 may be overcome, thereby permitting the valve 104 to move to the open position. Specifically, in the illustrated embodiment, when the pressure of the fluid in the rod-side chamber 58 exceeds a pressure threshold, such as when the rod 62 is fully retracted, a sufficient force may be exerted on the valve head 122 by the fluid in the second passage portion 112 to overcome the biasing force of the spring 104. Such a pressure may occur in the rod-side chamber 58 when the actuators 46A-D in series become out of phase or otherwise unsynchronized. In one embodiment, the spring constant of the spring 106 may be associated with the pressure threshold. It should be appreciated that, in alternative embodiments, the piston assembly 100 may be configured such that the valve 104 opens when the pressure of the fluid in the cap-side chamber 60 exceeds the pressure threshold.

Furthermore, as mentioned above, the first valve stem 128 extends into the rod-side chamber 58 when the valve 104 is located in the closed position. Thus, as shown in FIG. 7, when the rod 62 is fully extended, the first valve stem 128 may contact the gland 80 or another portion of the cylinder 56 disposed at the adjacent end of the cylinder 56, thereby pushing the valve 104 into the open position. Such contact may occur, for example, when the series-coupled actuators 46A-D become out of phase or otherwise unsynchronized.

As shown in FIG. 7, the mating surface 124 of the valve head 122 may be spaced apart from the valve seat 118 when the valve 104 is in the open position. As a result, the rod-side and cap-side chambers 58, 60 are fluidly coupled to each other when the valve 104 is in the open position so as to permit fluid flow therebetween. As such, the actuators 46A-D may be rephased or otherwise synchronized when the valve 104 is in the open position. In particular, permitting fluid flow between the rod-side and cap-side chambers 58, 60 of each of the actuators 46A-D in series equalizes the volume of fluid in each chamber 58, 60 to compensate for any leakage. As such, the extension and retraction of the actuators 46A-D may be synchronized. Additionally, in one embodiment, the second valve stem 130 may be configured to contact the washer 88 or another component of the piston assembly 100 (e.g., the piston 102) to limit the maximum distance away from the valve seat 118 that the valve head 122 may move.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A piston assembly for a fluid-driven actuator, the piston assembly comprising:
   a rod;
   a piston coupled to the rod, the piston separating first and second chambers of the fluid-driven actuator, the piston defining a passage extending between the first and second chambers, the piston further defining a valve seat;
   a valve positioned within the passage and slidable between an open position in which the valve head permits fluid flow through the passage and a closed position in which the valve head occludes fluid flow through the passage, the valve including a valve head in contact the valve seat when the valve is positioned in the closed position, the valve further including a first valve stem extending outward from a first side of the valve head and the passage into the second chamber when the valve is positioned in the closed position, the valve further including a second valve stem extending out of a second side of the valve head, the second valve stem configured to limit the relative movement between the valve seat and the valve head;

a piston assembly component fixed relative to the piston and positioned external to the piston and the rod; and a spring compressed between the valve head and the piston assembly component, the spring being configured to bias the valve to the closed position, wherein the valve is configured to move to the open position when a pressure in the second chamber exceeds a pressure threshold or when the first valve stem contacts a cylinder of the fluid-driven actuator.

2. The piston assembly of claim 1, wherein the passage includes a first passage portion and a second passage portion, the first passage portion having a first passage portion diameter and the second passage portion having a second passage diameter, the first passage portion diameter being larger than the second passage portion diameter.

3. The piston assembly of claim 2, wherein the valve head is positioned within the first passage portion and has a valve head diameter, the valve head diameter being larger than the second passage portion diameter.

4. The piston assembly of claim 2, wherein the first valve stem is positioned within the second passage portion and has a valve stem diameter, the valve stem diameter being smaller than the second passage portion diameter.

5. The piston assembly of claim 2, wherein the first passage portion is in fluid communication with the first chamber when the valve is positioned in the closed position and the second passage is in fluid communication with the second chamber when the valve is positioned in the closed portion.

6. The piston assembly of claim 1, wherein the pressure threshold is associated with a spring constant of the spring.

7. The piston assembly of claim 1, wherein the piston assembly component comprises a washer positioned between the piston and a fastener configured to couple the piston to the rod.

8. An agricultural implement, comprising:

a plurality of agricultural implement components; and first and second fluid-driven actuators, each fluid-driven actuator coupled between two of the plurality of agricultural implement components, each fluid-driven actuator comprising:

a cylinder defining first and second chambers;

a rod partially positioned within the cylinder a piston coupled to the rod, the piston positioned within the cylinder, the piston separating first and second chambers, the piston defining a passage extending between the first and second chambers;

a valve including a valve head and a valve stem, the valve being positioned within the passage and slidable between an open position in which the valve head permits fluid flow through the passage and a closed position in which the valve head occludes fluid flow through the passage, the valve stem extending outward from the passage into the second chamber when the valve is positioned in the closed position;

a piston assembly component fixed relative to the piston and positioned external to the piston and the rod; and a spring compressed between the valve head and the piston assembly component such that the spring is in direct contact with the piston assembly component, the spring being configured to bias the valve to the closed position, wherein the valve is configured to move to the open position when a pressure in the second chamber exceeds a pressure threshold or when the valve stem contacts the cylinder.

9. The agricultural implement of claim 8, wherein the first and second fluid-driven actuators are fluidly coupled to each other in series.

10. The agricultural implement of claim 8, wherein the first and second fluid-driven actuators are rephased when each of the valves of the first and second fluid-driven actuators are positioned in the open position.

11. The agricultural implement of claim 8, wherein the passage includes a first passage portion and a second passage portion, the first passage portion having a first passage portion diameter and the second passage portion having a second passage diameter, the first passage portion diameter being larger than the second passage portion diameter.

12. The agricultural implement of claim 11, wherein the valve head is positioned within the first passage portion and has a valve head diameter, the valve head diameter being larger than the second passage portion diameter.

13. The agricultural implement of claim 11, wherein the valve stem is positioned within the second passage portion and has a valve stem diameter, the valve stem diameter being smaller than the second passage portion diameter.

14. The agricultural implement of claim 11, wherein the first passage portion is in fluid communication with the first chamber when the valve is positioned in the closed position and the second passage is in fluid communication with the second chamber when the valve is positioned in the closed portion.

15. The agricultural implement of claim 8, wherein the pressure threshold is associated with a spring constant of the spring.

16. The agricultural implement of claim 8, wherein the piston further defines a valve seat, the valve head being in contact the valve seat when the valve is positioned in the closed position.

17. The agricultural implement of claim 8, wherein the piston assembly component comprises a washer positioned between the piston and a fastener configured to couple the piston to the rod.

18. The agricultural implement of claim 8, wherein the spring is in direct contact with the valve head.

19. An agricultural implement, comprising:

a plurality of agricultural implement components; and first and second fluid-driven actuators, each fluid-driven actuator coupled between two of the plurality of agricultural implement components, each fluid-driven actuator comprising:

a cylinder defining first and second chambers;

a piston positioned within the cylinder, the piston separating first and second chambers, the piston defining a passage extending between the first and second chambers, the passage including a first passage portion and a second passage portion, the first passage portion having a first passage portion diameter and the second passage portion having a second passage diameter, the first passage portion diameter being larger than the second passage portion diameter;

a valve including a valve head, a first valve stem extending outward from a first side of the valve head, and a second valve stem extending out of a second side of the valve head, the valve being positioned within the passage and slidable between an open position in which the valve head permits fluid flow through the passage and a closed position in which the valve head occludes fluid flow through the passage, the first passage portion being in fluid communication with the first chamber when the valve is positioned in the closed position, the second passage being in fluid communication with the second chamber when the valve is positioned in the closed portion; the first valve stem extending outward from the passage into the second chamber when the valve is positioned in the closed position, the second valve stem being configured to limit the relative movement between a valve seat and the valve head; and a spring compressed between the valve head and the piston, the spring being configured to bias the valve to the closed position, wherein the valve is configured to move to the open position when a pressure in the second chamber exceeds a pressure threshold or when the valve stem contacts the cylinder.

\* \* \* \* \*